Patented Jan. 14, 1936

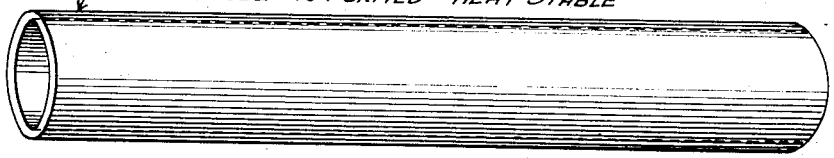
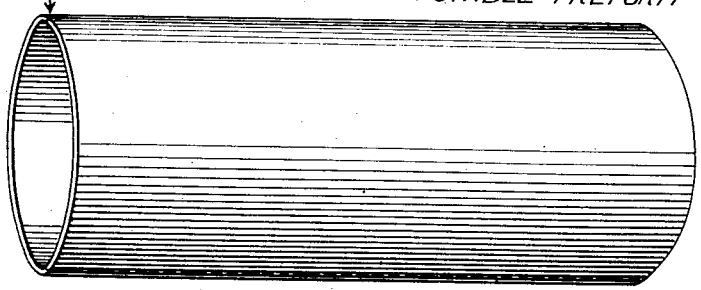
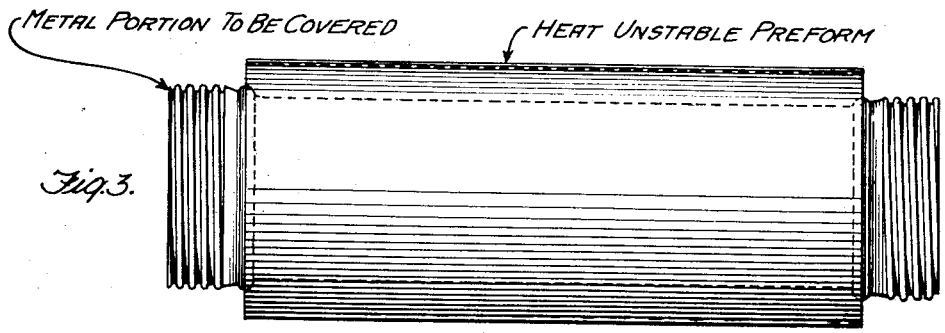
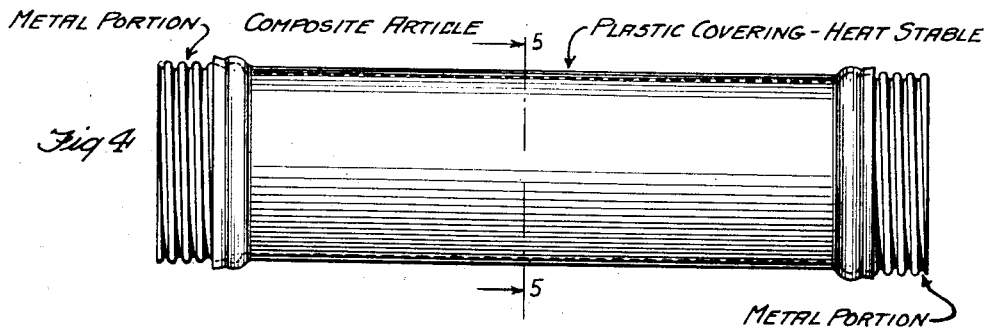
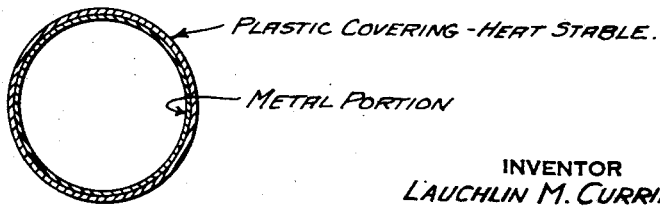

2,027,962

UNITED STATES PATENT OFFICE 2,027,962

PRODUCTION OF ARTICLES FROM PLASTIC COMPOSITIONS

Lauchlin M. Currie, Lakewood, Ohio, assignor to National Carbon Company, Inc., Cleveland, Ohio Application March 3, 1933, Serial No. 659,458

30 Claims. (Cl. 18—55)

The invention pertains to the production of articles composed wholly or in part of plastic compositions containing resinous materials, particularly those containing vinyl resins. The invention also includes novel articles which can be made by the new methods.

In general, the invention is concerned with resinous materials or their compositions, which are thermoplastic at least throughout a considerable range of temperature and possess great elasticity, and in which the elastic forces of the materials can be at least partially controlled. Such materials may be said to exist in two primary states which will be herein referred to as heat stable and heat unstable. The expression heat stable is used to describe that condition of the resin or composition in which all of its internal elastic forces are released and are in equilibrium. In this condition the resin or composition will not alter its physical form upon the application of heat until its plasticity becomes so great as to approach fluidity and thus allow it to distort by pure flow. Opposed to this condition is that condition which is termed heat unstable and which expresses the condition of the resin or composition in which the elastic forces are not all released and are merely held in the material because of its rigidity at temperatures below its heat distortion point. From this heat unstable condition the resin will, upon the application of heat above its heat distortion point, tend to change irreversibly and automatically in physical form or shape into that form or shape in which it last existed in a heat stable condition. In this connection heat stable and unstable have no reference to the chemical stability of the material, but express the state of purely physical forces within the resin mass.

The heat distortion point referred to above is that determined by the usual A. S. T. M. methods for testing thermoplastic materials.

The materials contemplated for use in my invention may be made into heat unstable shapes by mechanically altering the shape of any given mass of the material at any temperature below the temperature at which the resin or composition becomes so plastic as to approach fluidity at which temperature flow of the material does not involve change in the state of its elastic forces. It then may be converted from the heat unstable into a heat stable condition by the application of heat in practically any degree. At temperatures below the heat distortion point, the heat must be applied over a long period of time, and the time required to effect the change will vary inversely with the temperature. The upper temperature limit is that approaching the point at which decomposition of the resin becomes imminent.

An object of the invention is to provide novel methods for making articles composed at least in part of plastic compositions resinous materials. Another object is to provide new and useful articles formed at least in part from resin composition. Another object is to provide novel methods for forming articles comprising resin compositions which include the step of extruding the resin or composition. A further object is to provide novel methods for securing resin-containing plastic portions to other materials to form new composite articles. Other objects of the invention will be apparent from the description to follow.

In the drawing, Fig. 1 shows a plastic tube which may be used in practicing the invention;

Fig. 2 shows the plastic tube of Fig. 1 converted into a heat unstable preform;

Fig. 3 shows the preform of Fig. 2 in position with a metal object for forming a composite article in accordance with one embodiment of the invention;

Fig. 4 shows a finished composite article; and

Fig. 5 is a section through the composite article of Fig. 4 along the line 5—5.

Vinyl resins are examples of the resinous materials which are useful in the process of this invention. Throughout this specification and the claims the term vinyl resin will be understood to designate those artificial resinous products which may be made by the polymerization of vinyl esters, mixtures of vinyl esters, and mixtures containing vinyl esters and vinyl benzene.

Vinyl resins of various types are known and represent a diversity of artificial resins having varied characteristics. Polymerization products of vinyl esters of organic acids, particularly those of the lower fatty acids, such as vinyl acetate, propionate and butyrate, are generally fusible at relatively low temperatures, soluble in common organic solvents, such as benzene, alcohol and toluene, and are soft and adhesive in nature. Products resulting from the polymerization of vinyl esters of inorganic acids, especially the vinyl halides, are less readily fusible and soluble, harder, more brittle and much less adhesive than polymerized vinyl esters of organic acids. Polymerized vinyl benzene (styrene) resembles the polymerized vinyl halides with respect to the properties mentioned.

Vinyl resins made by the conjoint polymerization (by which is meant polymerization while in mutual contact) of a plurality of vinyl compounds differ greatly from mixtures of separately polymerized vinyl compounds and from the individual polymers. Vinyl resins such as those resulting from the conjoint polymerization of vinyl compounds of the groups mentioned above are preferred for use in accordance with this invention. Of the resinous products which may be made by the conjoint polymerization of vinyl compounds, products which are especially desirable are those which may be formed by conjointly polymerizing vinyl halides with vinyl esters of the lower fatty acids in the proportions of about 70% to about 95% of vinyl halide, and of these latter products, those which may be made from vinyl chloride are preferred.

The preferred vinyl resins may be made by processes which form no part of this invention. A particularly desirable process for making the preferred vinyl resins includes polymerization of the vinyl compounds at a temperature below about 60° C. and preferably at or below about 40° C. If liquid media are present during the polymerization, they should be selected from those liquids which are poor solvents or non-solvents for the resin formed, and the amount of the liquid medium should be small. Catalysts such as organic peroxides are satisfactory for promoting the polymerization.

The various vinyl resins discussed above may be modified as desired in forming the compositions with which this invention is concerned. For example, it is usually desirable to incorporate materials in the compositions to insure chemical stability of the resin. For this purpose basic materials are preferred, for example, calcium stearate made alkaline with hydrated lime, or other alkaline earth metal soaps, and metallic soaps in general are useful. The compositions may include filling materials both mineral and cellulosic in nature, as typified by cotton flock, alpha pulp, wood flour, silica, mica, talc, slate flour, asbestos and the like. Many of the vinyl resins are colorless or nearly so, hence, they may be colored with pigments, lakes or dyes to produce any desired shade of color, and they may be made transparent, translucent or opaque.

The process of this invention may include extrusion of the vinyl resin or other composition and for this reason it is especially desirable to incorporate lubricants in the mixture to be extruded. Examples of suitable lubricants are waxes, such as carnauba wax, candelilla wax, ceresin wax, halogenated diphenyl, and halogenated naphthalenes. These lubricants may be used in amounts not exceeding 10% by weight of the total composition and preferably about 3% is included. In general waxes or waxlike materials which soften and have lubricating properties at high temperatures and which are chemically inert toward vinyl resins are suitable.

The methods provided by this invention for making articles which are formed at least in part of vinyl resin or other resinous compositions as described above, are made possible by the discovery and utilization of the unique elastic properties of these plastic compositions. In general, the new processes involve the formation of a predetermined shape of the resin and the subsequent conversion of this preformed shape into the finished article or the portion thereof which is to be composed of the resinous composition. The conversion of the preform into its final form includes a heat treatment whereby the elastic properties of the resinous composition are utilized to cause the preform to assume the shape and form desired in the finished article.

In one embodiment of the invention the vinyl resin or other resinous composition may be extruded in the form of a rod. It has been found by test that the extrusion does not produce a rod having cross-sectional dimensions identical with that of the die aperture through which it is extruded, but rather a rod of considerably larger cross-section is obtained. For example, if a vinyl resin composition is extruded through a die having a circular opening 0.275 inch in diameter, the resulting rod will have a diameter of about 0.350 inch. If, however, the rod is chilled immediately upon extrusion from this same die, a rod more closely approximating the die opening is obtained, for example, one of about 0.300 inch in diameter. This rod can then be cut into sections and placed in a mold cavity, or other space which it is desired to fill, and which has a cross-section slightly less than the rod produced in the first instance, that is, of 0.350 inch diameter. When the mold is heated to above 75° C., say to 125° C., the extruded preform will expand in cross-section irreversibly to fill the mold and form the shaped object. This effect may be utilized in other ways to obtain the same result. For example, the extruded rod may be stretched while hot to reduce its diameter, or a warmed mass of the composition may be otherwise altered in shape and chilled in its distorted state. In either case the mass will, upon warming, tend to resume its former shape irreversibly to fill a mold cavity. This utilization of the remarkable elastic properties of vinyl resins and their compositions provides a novel and economical method for molding articles which can be conveniently preformed as described.

In another embodiment, the elastic properties of the vinyl resin or other resinous compositions are employed to form articles having a surface covering of the resin composition. In this case a tube of the composition as shown in Fig. 1, for example, a vinyl resin composition, is extruded and while hot it is made larger and chilled in its expanded form as shown in Fig. 2. This may be done by applying pneumatic pressure or other fluid pressure to the inside of the tube while confining the tube within a matrix of the size to which it is desired to expand the tube. In general, pressures up to about 80 pounds per square inch may be used, and 5 to 10 pounds per square inch is usually sufficient. The expanded tube is then placed over an object of any desired shape which has a total circumferential girth slightly greater than the original size of the tube before expanding, and the whole is warmed to a temperature above the heat distortion point of the vinyl resin, for instance, 125° C. The tube will then contract and tightly cover the article placed within it. By this means insulated, ornamented and protected articles of many kinds may be readily produced.

From the foregoing description of the invention in several embodiments it is apparent that the essential steps in the new method may be summarized as (1) the formation of a heat unstable preform of the resin portion of the article to be made, and (2) a heat treatment which irreversibly converts the preform into its final shape and makes it heat stable.

As before stated, the degree of heat required to cause the vinyl resin or other resin mass to change from a heat unstable to a heat stable condition may be any degree of heat above the heat distortion point of the pure resin as determined by A. S. T. M. methods for thermoplastic materials. In general, for the vinyl resins preferred for use in this invention, the heat distortion point may vary from about 60° to 70° C. The upper temperature limit is that which decomposition of the vinyl resin becomes imminent, or about 140° C. The vinyl resins or vinyl resin compositions may be formed into heat unstable shapes by mechanically altering the shape of any given mass of the material at any temperature below the temperature at which the resin becomes so plastic as to approach fluidity and at which temperatures flow of the material does not involve change in the state of its elastic forces.

The resin compositions which may be used in this invention may include filling materials up to about 50% by volume of the total, but the elastic properties of the composition which are herein utilized vary directly with the percentage of resin in the composition and are more pronounced in those materials containing a large proportion of resin. Compositions containing upwards of 75% of vinyl resin are preferred. The chemical stabilizing addition may be present in relatively small amounts, from 1% to 3%, based on the weight of vinyl resin, of alkaline calcium stearate or equivalent material is preferred. The lubricant, which is essential to obtain smooth surfaced extruded preforms, may be present in amounts not exceeding 10% by weight of the vinyl resin, and about 3% by weight is preferred.

Where extrusion methods are used in practicing the invention, temperatures and pressures in the extrusion device may vary widely. In general, temperatures of from 110° to 140° C. and pressures of from 1,000 to 10,000 pounds per square inch may be used.

The finished articles, particularly those made from vinyl resins, may be self-glossed or finished by dipping them in a solvent for the vinyl resin which imparts a lacquer-like polish to the surface after the solvent has been removed by drying. Suitable solvents for this self-lacquering operation are ketones, such as acetone, ethyl methyl ketone and methyl isobutyl ketone, halogenated hydrocarbons, such as chlorobenzene, propylene and ethylene dichlorides or dibromides and acetylene tetrachloride, and esters, such as ethyl acetate, butyl acetate and the like.

The invention will be illustrated by the following specific examples:

*Example 1*

A vinyl resin was prepared by conjointly polymerizing vinyl acetate and vinyl chloride in the proportions of about 80% by weight of vinyl chloride. The polymerization was conducted in the presence of acetone as a liquid medium and about 1% by weight of dibenzoyl peroxide as a catalyst at a temperature of about 30° C.

The resulting resin, after unpolymerized material and catalytic residues were removed, was compounded with about 3% by weight of carnauba wax and about 2% by weight of alkaline calcium stearate.

This composition was then charged into an internal pressure mixer heated by a steam jacket and agitated until it was thoroughly heated to about 125° C. It was then charged into the extrusion device where it was extruded under a pressure of about 2500 pounds per square inch through a die having a circular aperture 0.275 inch in diameter. The rod was chilled as it left the die and a rod having a diameter of 0.300 inch was obtained. This rod was cut into sections 3 inches in length, and the pieces were placed in the cavities of a tooth brush handle mold which had a cross-section slightly less than that of a rod 0.350 inch in diameter. The mold was then clamped in a closed position and heated to about 125° C. for 10 minutes. The mold was then opened and the tooth brush handles were found to be completely molded as well as is possible by standard hot pressing technique. In addition, the molded handles so made were free from internal strains which are not always absent in hot pressed articles.

*Example 2*

A hollow tube 0.75 inch in external diameter having a wall thickness of 0.0375 inch was extruded by a method and from a composition similar to that described in Example 1. The tube while hot was passed inside of a heavy cardboard tube having an internal diameter of 1.5 inches, and compressed air at 5 to 10 pounds per square inch was applied to the open end of the tube. This produced a tube of vinyl resin of approximately 1.5 inches external diameter which was chilled in this state.

The expanded tube was placed over a pipe which had an external diameter of 1.25 inches, and the whole was warmed to 110° C. for 10 minutes. During this time the expanded tube contracted to cover closely the pipe over which it was placed, and the coating so formed was hard, smooth and tough.

This process can be used to cover various types of inserts of practically any shape. For example, the process is adapted to make vinyl resin covered flashlight cases and fittings, pipe, furniture parts, rails, hand grips, tooth brush handles, vases and bric-a-brac, shockproof glassware, wire, cables and various other types of articles or materials of construction.

I claim:—

1. Method of producing articles having at least a portion thereof composed of a plastic composition containing thermoplastic resinous material, which comprises making a preform of said plastic portion and subjecting said preform to heat treatment solely to cause it to alter its physical form and to assume its final shape in said article and to make it heat stable.

2. Method of producing articles having at least a portion thereof composed of a plastic composition containing thermoplastic resinous material, which comprises making a heat unstable preform of said plastic portion and subjecting said preform to heat treatment solely to cause it to alter its physical form and to assume its final shape in said article and to make it heat stable.

3. Method of producing articles having at least a portion thereof composed of a vinyl resin composition which comprises making a preform of said vinyl resin portion and subjecting said preform to heat treatment to cause it to alter its physical form and to assume its final shape in said article and to make it heat stable.

4. Method of producing articles having at least a portion thereof composed of a vinyl resin composition which comprises making a heat unstable preform of said vinyl resin portion and subjecting said preform to heat treatment to cause it to alter its physical form and to assume its final form in said article and to make it heat stable.

5. Method of producing articles having at least a portion thereof composed of a vinyl resin composition which comprises extruding a preform of said vinyl resin portion, making a heat unstable preform from said extruded preform and subjecting said heat unstable preform to heat treatment to cause it to alter its physical form and to assume its final form in said article and to make it heat stable.

6. Method of producing articles having at least a portion thereof composed of a plastic composition containing resinous material, which comprises altering the shape of a heated mass of said composition, chilling the mass while so altered to form a heat unstable preform and thereafter heating said preform until it changes its physical form and becomes heat stable while confining said preform so that it assumes its final form in the article, said form having a cross-section greater than that of said preform and less than that of the original mass of the composition.

7. Method of producing articles having at least a portion thereof composed of a vinyl resin composition which comprises altering the shape of a heated mass of vinyl resin composition, chilling the mass while so altered to form a heat unstable preform, and thereafter heating said preform until it changes its physical form and becomes heat stable while confining said preform so that it assumes its final form in the article, said form having a cross-section greater than that of said preform and less than that of the original mass of vinyl resin composition.

8. Method of producing articles having at least a portion thereof composed of a vinyl resin composition which comprises extruding a rod of a vinyl resin composition, chilling the rod as extruded to cause it to remain in a heat unstable condition with a cross-section less than it would occupy in a heat stable condition, and thereafter heating the rod until it changes its physical form and becomes heat stable while confining said preform so that it assumes its final form in the article, said form having a greater cross-section than said rod and less than that of said rod in a heat stable condition.

9. Method of producing articles having at least a portion thereof composed of a composition containing a predominating proportion of a vinyl resin identical with a resin resulting from the conjoint polymerization of at least two compounds of the group consisting of vinyl halides, vinyl esters of lower fatty acids and vinyl benzene which comprises altering the shape of a heated mass of vinyl resin composition, chilling the mass while so altered to form a heat unstable preform, and thereafter heating said preform until it changes its physical form and becomes heat stable while confining said preform so that it assumes its final form in the article, said form having a cross-section greater than that of said preform and less than that of the original mass of vinyl resin composition.

10. Method of producing articles having at least a portion thereof composed of a composition containing a predominating proportion of a vinyl resin identical with a resin resulting from the conjoint polymerization of a vinyl halide and a vinyl ester of a lower fatty acid in the proportions of about 70% to about 95% of the vinyl halide which comprises altering the shape of a heated mass of vinyl resin composition, chilling the mass while so altered to form a heat unstable preform, and thereafter heating said preform until it changes its physical form and becomes heat stable while confining said preform so that it assumes its final form in the article, said form having a cross-section greater than that of said preform and less than that of the original mass of vinyl resin composition.

11. Method of producing articles having at least a portion thereof composed of a composition containing a predominating proportion of a vinyl resin identical with a resin resulting from the conjoint polymerization of vinyl chloride and vinyl acetate in the proportions of about 70% to about 95% of vinyl chloride which comprises altering the shape of a heated mass of vinyl resin composition, chilling the mass while so altered to form a heat unstable preform, and thereafter heating said preform until it changes its physical form and becomes heat stable while confining said preform so that it assumes its final form in the article, said form having a cross-section greater than that of said preform and less than that of the original mass of vinyl resin composition.

12. Method of producing articles having at least a portion thereof composed of a composition containing a predominating proportion of a vinyl resin identical with a resin resulting from the conjoint polymerization of vinyl chloride and vinyl acetate in the proportions of about 70% to about 95% of vinyl chloride together with up to about 10% of a wax-like lubricant which comprises altering the shape of a heated mass of vinyl resin composition, chilling the mass while so altered to form a heat unstable preform, and thereafter heating said preform until it changes its physical form and becomes heat stable while confining said preform so that it assumes its final form in the article, said form having a cross-section greater than that of said preform and less than that of the original mass of vinyl resin composition.

13. Method of producing articles having at least a portion thereof composed of a composition containing a predominating proportion of a vinyl resin identical with a resin resulting from the conjoint polymerization of vinyl chloride and vinyl acetate in the proportions of about 70% to about 95% of vinyl chloride together with up to about 10% of a wax-like lubricant and a basic stabilizing material which comprises altering the shape of a heated mass of vinyl resin composition, chilling the mass while so altered to form a heat unstable preform, and thereafter heating said preform until it changes its physical form and becomes heat stable while confining said preform so that it assumes its final form in the article, said form having a cross-section greater than that of said preform and less than that of the original mass of vinyl resin composition.

14. Method of producing articles having at least a portion thereof composed of a plastic composition containing resinous material, which comprises making a hollow preform of said plastic portion, expanding said hollow preform while heated and chilling it in an expanded and heat unstable condition, and thereafter placing said expanded hollow preform over an insert of larger dimensions than the hollow preform prior to expanding but smaller than the expanded preform, and subjecting it to heat treatment to cause it to cover tightly said insert and to make said plastic portion heat stable.

15. Method of producing articles having at least a portion thereof composed of a vinyl resin composition which comprises making a hollow preform of said vinyl resin portion, expanding said hollow preform while heated and chilling it in an expanded and heat unstable condition, and thereafter placing said expanded hollow preform over an insert of larger dimensions than the hollow preform prior to expanding but smaller than the expanded preform and subjecting it to heat treatment to cause it to cover tightly said insert and to make said vinyl resin portion heat stable.

16. Method of producing articles having at least a portion thereof composed of a vinyl resin composition which comprises extruding a hollow preform of said vinyl resin portion, expanding said hollow preform while heated and chilling it in an expanded and heat unstable condition, and thereafter placing said expanded hollow preform over an insert of larger dimensions than the hollow preform prior to expanding but smaller than the expanded preform, and subjecting it to heat treatment to cause it to cover tightly said insert and to make said vinyl resin portion heat stable.

17. Method of producing articles having at least a portion thereof composed of a vinyl resin composition which comprises extruding a hollow preform of said vinyl resin portion, expanding said hollow preform by means of pneumatic pressure applied thereto internally while heated and chilling it in an expanded and heat unstable condition, and thereafter placing said expanded hollow preform over an insert of larger dimensions than the hollow preform prior to expanding but smaller than the expanded preform, and subjecting it to heat treatment to cause it to cover tightly said insert and to make said vinyl resin portion heat stable.

18. Method of producing articles having at least a portion thereof composed of a composition containing a predominating proportion of a vinyl resin identical with a resin resulting from the conjoint polymerization of at least two compounds of the group consisting of vinyl halides, vinyl esters of lower fatty acids and vinyl benzene which comprises making a hollow preform of said vinyl resin portion, expanding said hollow preform while heated and chilling it in an expanded and heat unstable condition, and thereafter placing said expanded hollow preform over an insert of larger dimensions than the hollow preform prior to expanding but smaller than the expanded preform, and subjecting it to heat treatment to cause it to cover tightly said insert and to make said vinyl resin portion heat stable.

19. Method of producing articles having at least a portion thereof composed of a composition containing a predominating proportion of a vinyl resin identical with a resin resulting from the conjoint polymerization of a vinyl halide and a vinyl ester of a lower fatty acid in the proportions of about 70% to about 95% of the vinyl halide which comprises making a hollow preform of said vinyl resin portion, expanding said hollow preform while heated and chilling it in an expanded and heat unstable condition, and thereafter placing said expanded hollow preform over an insert of larger dimensions than the hollow preform prior to expanding but smaller than the expanded preform, and subjecting it to heat treatment to cause it to cover tightly said insert and to make said vinyl resin portion heat stable.

20. Method of producing articles having at least a portion thereof composed of a composition containing a predominating proportion of a vinyl resin identical with a resin resulting from the conjoint polymerization of vinyl chloride and vinyl acetate in the proportions of about 70% to about 95% of vinyl chloride which comprises making a hollow preform of said vinyl resin portion, expanding said hollow preform while heated and chilling it in an expanded and heat unstable condition, and thereafter placing said expanded hollow preform over an insert of larger dimensions than the hollow preform prior to expanding but smaller than the expanded preform, and subjecting it to heat treatment to cause it to cover tightly said insert and to make said vinyl resin portion heat stable.

21. Method of producing articles having at least a portion thereof composed of a composition containing a predominating proportion of a vinyl resin identical with a resin resulting from the conjoint polymerization of vinyl chloride and vinyl acetate in the proportions of about 70% to about 95% of vinyl chloride together with up to about 10% of a wax-like lubricant which comprises making a hollow preform of said vinyl resin portion, expanding said hollow preform while heated and chilling it in an expanded and heat unstable condition, and thereafter placing said expanded hollow preform over an insert of larger dimensions than the hollow preform prior to expanding but smaller than the expanded preform, and subjecting it to heat treatment to cause it to cover tightly said insert and to make said vinyl resin portion heat stable.

22. Method of producing articles having at least a portion thereof composed of a composition containing a predominating proportion of a vinyl resin identical with a resin resulting from the conjoint polymerization of vinyl chloride and vinyl acetate in the proportions of about 70% to about 95% of vinyl chloride together with up to about 10% of a wax-like lubricant and a basic stabilizing material which comprises making a hollow preform of said vinyl resin portion, expanding said hollow preform while heated and chilling it in an expanded and heat unstable condition, and thereafter placing said expanded hollow preform over an insert of larger dimensions than the hollow preform prior to expanding but smaller than the expanded preform, and subjecting it to heat treatment to cause it to cover tightly said insert and to make said vinyl resin portion heat stable.

23. A preform composed of a plastic composition containing thermoplastic resinous material in a heat unstable condition which is capable of altering its physical form upon the application of heat alone to assume a heat stable condition.

24. A preform composed of a vinyl resin composition in a heat unstable condition which is capable of altering its physical form upon the application of heat to assume a heat stable condition in a finished article.

25. A preform composed of a composition containing a preponderating proportion of a vinyl resin identical with a resin resulting from the conjoint polymerization of at least two compounds of the group consisting of vinyl halides, vinyl esters of lower fatty acids and vinyl benzene, which preform is in a heat unstable condition and which is capable of altering its physical form upon the application of heat to assume a heat stable condition in a finished article.

26. A preform composed of a composition containing a preponderating proportion of a vinyl resin identical with a resin resulting from the conjoint polymerization of a vinyl halide and a vinyl ester of a lower fatty acid in the proportion of about 70% to about 95% of the vinyl halide, which preform is in a heat unstable condition and which is capable of altering its physical form upon the application of heat to assume a heat stable condition in a finished article.

27. A preform composed of a composition containing a preponderating proportion of a vinyl resin identical with a resin resulting from the conjoint polymerization of vinyl chloride and vinyl acetate in the proportions of about 70% to about 95% of vinyl chloride, which preform is in a heat unstable condition and which is capable of altering its physical form upon the application of heat to assume a heat stable condition in a finished article.

28. A hollow expanded preform composed of a vinyl resin composition in a heat unstable condition which is capable of contracting and assuming a heat stable condition upon the application of heat to cover an insert placed therein.

29. A preform composed of a mass of a plastic composition containing thermoplastic resinous material in a distorted state and heat unstable condition which is capable of changing its physical shape and assuming a heat stable condition upon the application of heat alone.

30. A preform composed of a mass of vinyl resin composition in a distorted state and heat unstable condition which is capable of changing its physical shape and asuming a heat stable condition upon the application of heat.

LAUCHLIN M. CURRIE.